US011260334B2

(12) United States Patent
Suzuki et al.

(10) Patent No.: US 11,260,334 B2
(45) Date of Patent: Mar. 1, 2022

(54) DUST COLLECTOR AND DUST REMOVAL METHOD FOR SAME

(71) Applicant: SINTOKOGIO, LTD., Nagoya (JP)

(72) Inventors: Takashi Suzuki, Aichi (JP); Hiroyuki Amano, Aichi (JP); Kazuhiko Kitahora, Aichi (JP); Masanori Uchida, Aichi (JP); Koh Saito, Aichi (JP)

(73) Assignee: SINTOKOGIO LTD., Aichi (JP)

( * ) Notice: Subject to any disclaimer, the term of this patent is extended or adjusted under 35 U.S.C. 154(b) by 213 days.

(21) Appl. No.: 16/518,673

(22) PCT Filed: Dec. 12, 2017

(86) PCT No.: PCT/JP2017/044532
§ 371 (c)(1),
(2) Date: Jul. 22, 2019

(87) PCT Pub. No.: WO2018/139083
PCT Pub. Date: Aug. 2, 2018

(65) Prior Publication Data
US 2020/0009490 A1    Jan. 9, 2020

(30) Foreign Application Priority Data

Jan. 24, 2017   (JP) .............................. JP2017-010096

(51) Int. Cl.
*B01D 46/00* (2006.01)
*B01D 46/04* (2006.01)
*B01D 46/52* (2006.01)

(52) U.S. Cl.
CPC ......... *B01D 46/04* (2013.01); *B01D 46/0079* (2013.01); *B01D 46/521* (2013.01)

(58) Field of Classification Search
CPC .. B01D 46/04; B01D 46/0079; B01D 46/002; B01D 46/521; B01D 46/0068; B01D 46/023; B01D 46/0071; B01D 46/2411
(Continued)

(56) References Cited

U.S. PATENT DOCUMENTS

| 3,816,979 A | 6/1974 | Wales |
| 3,864,108 A | 2/1975 | Brookman |

(Continued)

FOREIGN PATENT DOCUMENTS

| CN | 1133018 A | 10/1996 |
| JP | S54-031674 A | 3/1979 |

(Continued)

OTHER PUBLICATIONS

Office Action in Taiwan Application No. 106145061, dated Jan. 15, 2021, 7 pages.

(Continued)

*Primary Examiner* — Minh Chau T Pham
(74) *Attorney, Agent, or Firm* — Crowell & Moring LLP (57) ABSTRACT

An object of the present invention is to provide a dust collector including a pulse jet type dust removal mechanism capable of uniformly removing dust over the entire length of a cylindrical filter without increasing the pressure loss of the cylindrical filter; and a dust removal method for such a dust collector. The dust collector of the present invention is a dust collector including a pulse jet type dust removal mechanism for removing dust adhered to cylindrical filters, in which the pulse jet type dust removal mechanism includes: a first discharge section having first discharge nozzles for discharging pulse jets from first end side openings of the cylindrical filters toward inside of the cylindrical filters; and a second discharge section having second nozzles for discharging pulse jets from second end sides of the cylindrical filters (Continued)

toward openings on the first end side of the cylindrical filters, and the second nozzles for discharging are each provided on a tip side of a pipe line extending from the first end side to the second end side of the cylindrical filter.

12 Claims, 6 Drawing Sheets

(58) Field of Classification Search
USPC .............. 55/287, 294, 302; 95/268, 279, 280
See application file for complete search history.

(56) References Cited

U.S. PATENT DOCUMENTS

| | | | |
|---|---|---|---|
| 4,058,379 A | 11/1977 | Cheng | |
| 4,280,826 A * | 7/1981 | Johnson, Jr. | B01D 46/0001 55/302 |
| 4,297,115 A * | 10/1981 | Johnson, Jr. | B01D 46/0043 55/302 |
| 5,178,652 A * | 1/1993 | Huttlin | B01D 46/0021 55/302 |
| 5,562,251 A | 10/1996 | Elliott | |
| 5,887,797 A | 3/1999 | Elliott | |
| 6,036,751 A * | 3/2000 | Ribardi | B01D 46/0068 220/203.01 |
| 6,451,091 B1 * | 9/2002 | Avina | B01D 46/44 55/341.1 |
| 7,815,701 B2 * | 10/2010 | Grieve | B01D 41/04 55/294 |
| 8,021,467 B2 * | 9/2011 | Zimmer | B01D 46/04 95/279 |
| 8,048,207 B1 * | 11/2011 | Streichsbier | B01D 46/446 95/279 |
| 8,236,076 B2 * | 8/2012 | Grieve | B01D 41/04 55/294 |
| 8,277,526 B2 * | 10/2012 | Cho | B01D 46/2403 55/294 |
| 8,303,688 B2 * | 11/2012 | Sharma | B01D 46/2407 95/268 |
| 8,876,928 B2 * | 11/2014 | Szczap | B01D 46/0068 55/287 |
| 2011/0209612 A1 * | 9/2011 | Bansal | B01D 46/543 95/70 |

FOREIGN PATENT DOCUMENTS

| | | |
|---|---|---|
| JP | S62-013516 U | 1/1987 |
| JP | 3138283 U | 12/2007 |
| JP | 2010-089024 A | 4/2010 |
| JP | 2010-089024 A | 4/2010 |
| JP | 2011-245439 A | 12/2011 |
| TW | 265636 | 12/1995 |

OTHER PUBLICATIONS

Extended European Search Report in Europe Application No. 17893706.6, dated May 27, 2020, 8 pages.

* cited by examiner

DUST COLLECTOR AND DUST REMOVAL METHOD FOR SAME

This application is a 371 application of PCT/JP2017/044532 having an national filing date of Dec. 12, 2017, which claims priority to JP2017-010096 filed Jan. 24, 2017, the entire content of each of which is incorporated herein by reference.

TECHNICAL FIELD

The present invention relates to a dust collector and a dust removal method for the same, and more specifically relates to a dust collector including a pulse jet type dust removal mechanism for removing dust adhered to a cylindrical filter, and a dust removal method from a filter in such a dust collector.

BACKGROUND ART

As a dust collector that removes dust from dust-containing gas containing dust by a filter, a dust collector including a pulse jet type dust removal mechanism for ejecting compressed air from a discharge section in a pulsed state, in order to remove dust adhered to a filter is known.

For example, a dust collector including a dust removal mechanism for increasing the internal pressure of a filter to equal in the internal pressure over the entire length of the filter by providing a tapered tube having a frustoconical shape in the cylindrical filter, or providing a concave bottom plate in a lower end of the filter is known (for example, refer to Patent Document 1).

PRIOR ART DOCUMENT

Patent Document

Patent document 1: Japanese Patent Unexamined No. 2011-245439

SUMMARY OF THE INVENTION

Problem to be Solved by the Invention

However, in the above dust removal mechanism, an effect of uniformly removing dust over the entire length of a cylindrical filter is still insufficient. Furthermore, a member that obstructs a flow of air is installed in the cylindrical filter, and therefore there is a problem that the pressure loss of the filter is increased.

The present invention has been made in view of such points, and an object of the present invention is to provide a dust collector including a pulse jet type dust removal mechanism capable of uniformly renaming dust over the entire length of a cylindrical filter without increasing the pressure loss in the cylindrical filter; and a dust removal method for such a dust collector.

Means for Solving Problem

According to the present invention, there is provided a dust collector including a pulse jet type dust removal mechanism for removing dust adhered to a cylindrical filter, the pulse jet type dust removal mechanism comprising a first discharge section having a first discharge nozzle for discharging a pulse jet from an opening on a first end side of the cylindrical filter toward inside of the cylindrical filter; and a second section for discharging having a second discharge nozzle for discharging a pulse jet from a second end side of the cylindrical filter toward the opening on the first end side of the cylindrical filter, and the second discharge nozzle for the discharging is provided on a tip side of a pipe line extending from the first end side of the cylindrical filter to the second end side of the cylindrical filter.

According to such a configuration, any member that increases the pressure loss of the filter of the internal space of the cylindrical filter is not disposed, and furthermore, the oppositely facing pulse jets are discharged from both end sides of the cylindrical filter toward the internal space of the cylindrical filter, and therefore dust can be uniformly removed over the entire length of the cylindrical filter without increasing the pressure loss in the cylindrical filter.

Furthermore, the pulse jet discharge nozzles for dust removal can be disposed at oppositely facing positions in the filter without adding any significant change to an existing dust collector.

According to another preferred aspect of the present invention, the pipe line has an inverting path provided in a tip part, and the second discharge nozzle is provided in a tip of the inverting path.

According to such a configuration, the pulse jet discharge nozzles for dust removal can be disposed at oppositely facing positions in the filter with a simple configuration.

According to another preferred aspect of the present invention, the inverting path has a substantial U-shape.

According to another preferred aspect of the present invention, the pipe line is disposed in an internal space of the cylindrical filter that is a space into which cleaned air is introduced.

In a configuration in which the pipe line is disposed on the outside of the cylindrical filter where dust exists, there is a possibility that dust enters the pipe line at this portion, and is ejected from the tip of the pipe line into the filter. Therefore, in the configuration in which the pipe line is disposed on the outside of the cylindrical filter, it is necessary to secure airtightness of the pipe line, and the manufacturing cost of the device is increased. However, according to the above configuration, the pipe line is disposed in the internal space of the cylindrical filter that is the space into which cleaned air is introduced, and therefore high airtightness of the pipe line itself is not required, and the manufacturing cost of the collector and the like are reduced.

According to another preferred aspect of the present invention, the pipe line is disposed outside the cylindrical filter, and the path penetrates the filter on the second end side of the cylindrical filter to extend into an internal space of the cylindrical filter.

According to such a configuration, any member that obstructs the flow of air does not exist inside the cylindrical filter, and therefore the flow of the air becomes smooth in the internal space of the filter.

According to another preferred aspect of the present invention, the second discharge nozzle has at tapered shape.

According to such a configuration, pressure and speed of the discharged pulse jet is increased by the tapered discharge nozzle. As a result, the higher-speed pulse jet reaches to further area, and furthermore the higher-speed pulse jet takes in a larger quantity of surrounding air, so that a dust removal will be effectively improved.

According to another preferred aspect of the present invention, the second discharge nozzle has an expanded shape.

According to such a configuration, the discharged pulse jet is expanded by the expanded shape of the nozzle, and a dust removal effect can be obtained in a wider area of the inside of the filter.

According to another preferred aspect of the present invention, a tip side of the inverting path is branched into a plurality of portions, and a second discharge nozzle is provided in each of the portions.

According to such a configuration, particularly, when the internal cross-section area of the cylindrical filter is wide, a dust removal effect can be obtained in a wider area of the inside of the filter by the discharge of the pulse jets from the plurality of portions.

According to another preferred aspect of the present invention, the second discharge section is configured integrally with the cylindrical filter, and is configured to be integrally detachable from the dust collector.

According to such a configuration, the filter can be detached without additional operation, and it is possible to easily detach the filter similarly to a conventional manner.

According to another preferred aspect of the present invention, the dust collector including a cell plate partitioned into a dust chamber and a cleaned air chamber; and a filter frame for mounting the cylindrical filter on the cell plate, wherein the filter frame has a projection complementary to a hole formed on the first end side of the cylindrical filter, and the cylindrical filter is detachably mounted on the dust collector by fitting of the projection in the hole.

According to such a configuration, positioning of the discharge positions of the pulse jets and the center position of the filter is reliably and easily performed, and an effective dust removal effect by the pulse jets can be obtained.

There is provided a dust removal method for an of the above dust collectors, the dust removal method including a step of discharging the pulse jet from the first discharge section and the second discharge section to remove dust from the cylindrical filter. Wherein the discharge of the pulse jet from the first discharge section and the discharge of the pulse jet from the second discharge section are started with a time difference.

According to such a configuration, pressure rising portion generated by collision of the two pulse jets can be changed, and therefore dust on a specific portion of the filter can be reliably removed.

According to another preferred aspect of the present invention, the removing step is performed while the time difference is changed.

According to such a configuration, the pressure rising portion is sequentially moved in the filter, and dust of the entire filter can be effectively removed.

Effects of the Invention

According to the present invention, there is provided a dust collector including a pulse jet type dust removal mechanism capable of uniformly removing dust over the entire length of the cylindrical filter without increasing the pressure loss in the cylindrical filter, and a dust removal method for such a dust collector.

DESCRIPTION OF THE PREFERRED EMBODIMENTS

Hereinafter, a dust collector of a first embodiment of the present invention will be described with reference to the drawings. The dust collector of this embodiment is a dust collector including a pulse jet type dust removal mechanism for removing dust adhered to a cylindrical filter.

Figure 1:
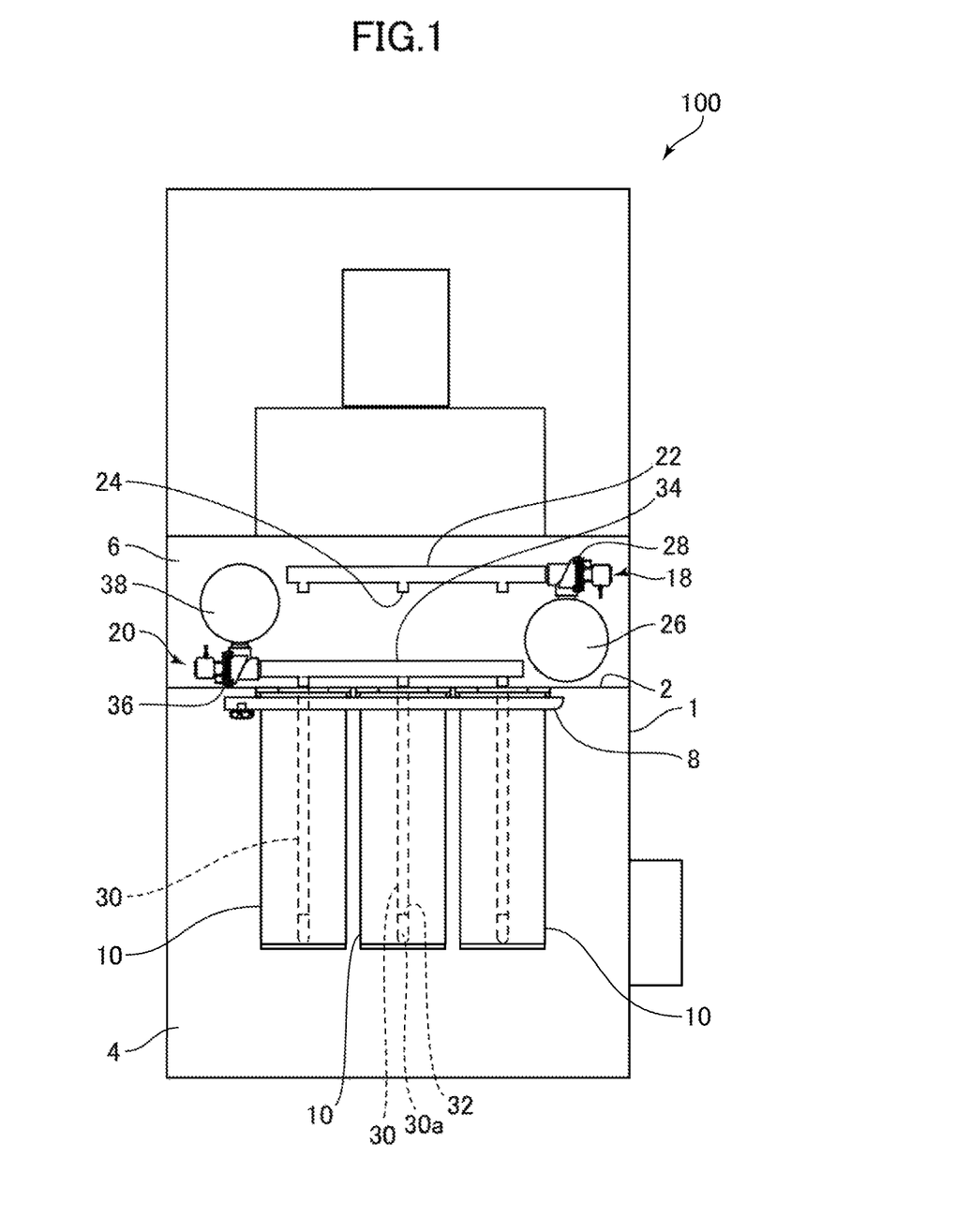
FIG. 1 is a schematically cross sectional view illustrating a configuration of a dust collector including a pulse jet type dust removal mechanism of a preferred embodiment of the present invention.

FIG. 1 is a schematically sectional view illustrating a configuration of a dust collector 100 including a pulse jet type dust removal mechanism of this embodiment.

As illustrated in FIG. 1, the dust collector 100 includes a housing 1. An internal space of the housing 1 is divided or partitioned into a dust chamber 4 into which dust-containing air containing dust is introduced, and a cleaned air chamber 6 into which cleaned air obtained by removing dust is introduced, by a cell plate 2 serving as a partition plate.

A plurality of (three in this embodiment) cylindrical filters 10 having bottom portion, are mounted on the cell plate 2 serving as the partition plate via a filter frame 8. In this embodiment, the filter 10 has a pleat shape, and is a structure in which dust is filtered by an outer surface of filter cloth (cloth) and is captured. However, the present invention is not limited to the filter having this structure, and a filter having other structure, for example, using cylindrical cloth may be used.

Figure 2:
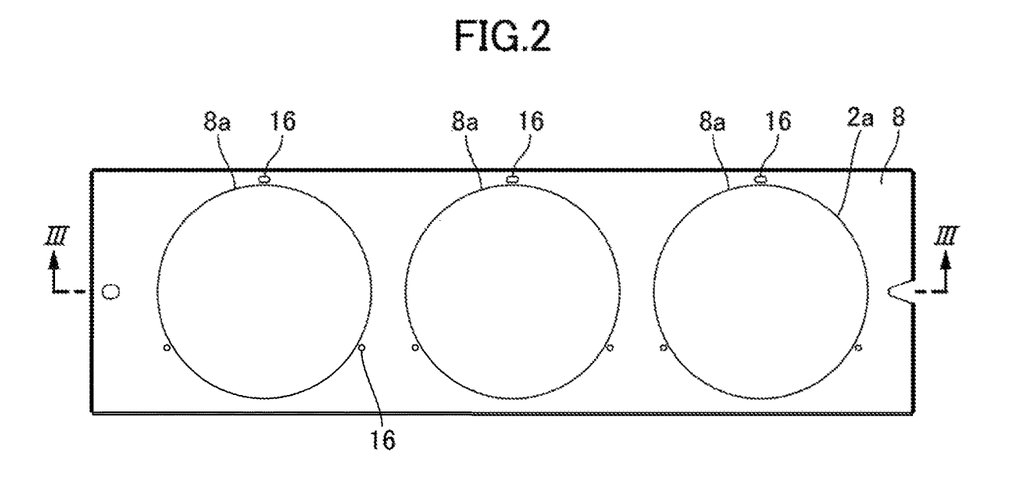
FIG. 2 is a plan view of a filter frame of the dust collector shown in FIG. 1.
Figure 3:
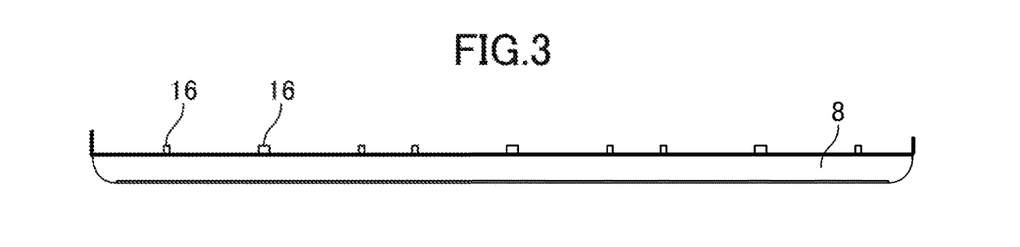
FIG. 3 is a sectional view taken along III-III line in FIG. 2.
Figure 4:
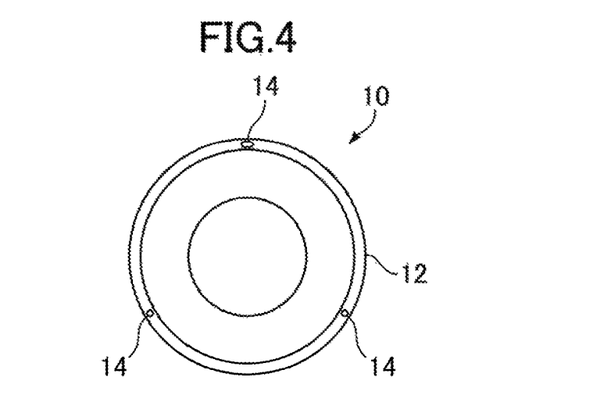
FIG. 4 is a plan view of a filter upper plate of the dust collector of FIG. 1.

FIG. 2 is a plan view of the filter frame 8, and FIG. 3 is a cross sectional view taken along III-III line in FIG. 2. FIG. 4 is a plan view of each cylindrical filter 10.

As illustrated in FIG. 2, a circular opening 8a sized suitably for the outer diameter of the cylindrical filter 10 is formed in the filter frame 8. Projections 16 are formed on an outer edge of each of the openings 8a of the filter frame 8 at predetermined angles (120 degrees in this embodiment).

As illustrated in FIG. 4, each of the cylindrical filters 10 includes a filter upper plate 12 on one end. The filter upper plate annular frame member made from plastic, metal, or the like, and is provided with fixing holes 14 complementary to the projections 16 of the filter frame 8 at predetermined angles (120 degrees in this embodiment).

In this embodiment, the filter upper plates 12 are disposed such that the filter upper plate 12 align with the openings of the filter frame 8, and the projections 16 on the outer edges of the openings 8a of the filter frame 8 are fitted into the holes 14 of the filter upper plate 12, so that the cylindrical filter 10 is mourned on the filter frame 8.

In this embodiment, the filter frame 8 mounted with the cylindrical filter 10 is fitted in a filter frame mounting member (not illustrated) provided in the cell plate 2, so that the cylindrical filter 10 is mounted on the cell plate 2 through the filter frame 8.

With such a configuration, dust-containing air on the dust chamber 4 side flows into the cleaned air chamber 6 through the filter 10.

The dust collector 100 of this embodiment includes a pulse jet type dust removal mechanism for removing dust adhered to the cylindrical filters 10. This pulse jet type dust removal mechanism includes s a first discharge section and a second discharge section 20.

The first discharge section 18 is configured to discharge pulse jet from first end openings of the cylindrical filter 10 toward the inside of the cylindrical filter. More specifically, the first discharge section 18 is disposed at an upper position of the cell plate 2, and includes a manifold 22 disposed in substantially parallel to the cell plate 2, and a plurality of first discharge nozzles 24 formed in this manifold 22.

The first discharge nozzle 24 is disposed on the first side of the cylindrical filter 10 (filter upper plate side, that is, the filter frame side) such that discharge port is directed to the inside of the cylindrical filter 10 on the center axe of the cylindrical filter 10, and is configured to discharge compressed air supplied through the manifold 22 as pulse jets from the first end side opening of the cylindrical filter 10 toward the inside of the cylindrical filter 10.

On a base end of the manifold 22, a first air tank 26, and a first solenoid valve 28 having an air valve are provided. The first discharge section 18 configured such that compressed air is supplied to the first discharge nozzles 24 through the manifold 22 by the first air tank 26 and the first solenoid valve 28.

On the other hand, the second discharge section 20 is configured to discharge pulse jet from the second end of the cylindrical filter 10 toward the first end side openings of the cylindrical filter 10. More specifically, the second discharge section 20 includes pipe lines 30 each extending from the first end to the second end in an internal space of the cylindrical filter 10, and second discharge nozzle 32 provided in tip of the pipe line 30. Each pipe line 30 has a substantially U-shaped inverting path 30a on the tip portion (second end side), and is provided with a second discharge nozzle 32 in a tip of the inverting path 30a.

Figure 5:
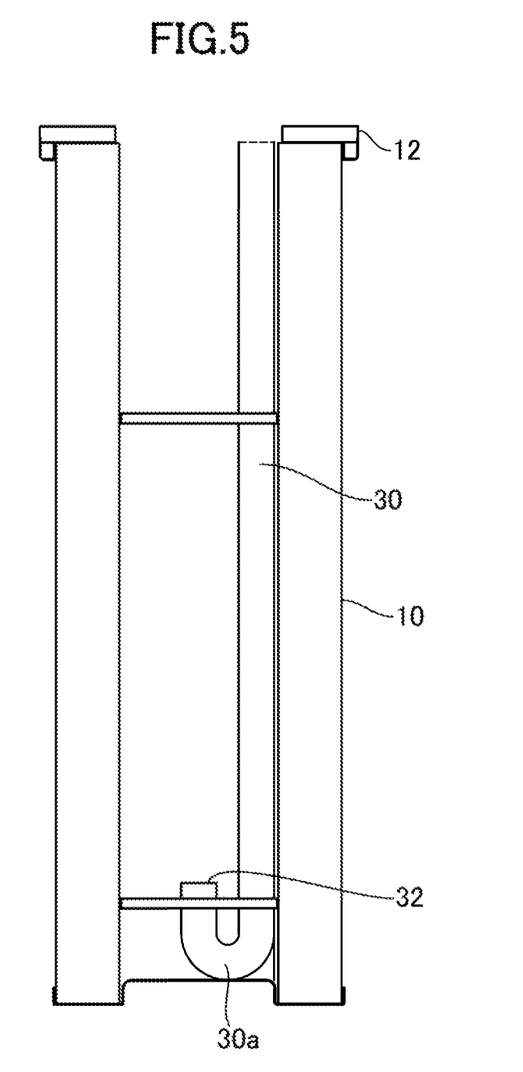
FIG. 5 is a schematically longitudinal sectional view illustrating a configuration of a filter vicinity of the dust collector of FIG. 1.

In this embodiment, as illustrated in FIG. 5, the inverting path 30a each have a substantially U-shape that inverts while drawing a curved line, that is, while curving. Each pipe line 30 has a substantially J-shape as a whole by this substantially U-shaped inverting path 30a on the tip end.

The pipe lines 30 are disposed so as to extend along (in contact with) inner circumferential surface of the cylindrical filter 10, and the second discharge nozzle 32 are configured such that discharge port on tips is located at the center (on the center axe) of the cylindrical filter 10 and opens toward the first end side opening of the cylindrical filter 10.

Therefore, in this embodiment, discharge port of the first discharge nozzle 24 and the discharge port of the second discharge nozzle 32 are disposed so as to oppositely face each other on the center axe of the cylindrical filter 10.

Upper end of the pipe line 30 is directly connected to a manifold 34 provided with a second solenoid valve 36 having an air valve, and are communicated with a second air tank 38.

The upper end of the pipe line 30 may not be directly connected to the manifold 34, and may be disposed in a state separated by about several millimeters, or may be connected to the manifold 34 by using any joint member.

In this embodiment, the second discharge nozzle 32 is integrally formed with the pipe line 30. However, the second discharge nozzle 32 may be formed as separate members detachable from the pipe line 30.

As described above, in this embodiment, the discharge port of the first discharge nozzle 24 and the discharge port of the second discharge nozzle 32 are disposed so as to oppositely face each other on the center axe of the cylindrical filter 10, and therefore pulse jets from the upper first discharge nozzle 24, and pulse jet from the lower second, discharge nozzle 32 are caused to collide head-on with each other, so that it is possible to efficiently increase the pressure of the internal spaces of the cylindrical filter 10.

In this embodiment, the pipe line 30 is disposed in the internal spaces of the cylindrical filter 10 in a state of being in contact with inner surface of the cylindrical filter 10. More specifically, projections are provided in the upper and lower ends of the pipe line 30, holes or recesses complementary to the projections on the pipe line side are provided in the cylindrical filter 10, and the projections of the pipe line 30 are fitted into the holes or the like on the filter sides, so that the pipe line 30 is connected to the cylindrical filter 10.

However, the pipe line 30 may be fixed to the internal space of the cylindrical filter 10 so as to extend in contact with the inner circumferential surface of the cylindrical filter 10 by using other fixing member.

Thus, the pipe line 30 is positioned so as to extend in contact with the inner circumferential surface, of the cylindrical filter 10, so that the pipe line 30 is unlikely to become obstacle to the pulse jet from the upper first discharge nozzle 24, and the pulse jet from the lower second discharge nozzle 32.

The pipe line 30 may have a structure of being integrally configured with the cylindrical filter 10, and integrally detachable from the dust collector. According to such a configuration, it is possible to easily perform maintenance operation such as filter replacement similar to conventional operation in a operation such that the replacement of the cylindrical filter 10.

In the dust collector thus configured, similarly to a conventional dust collector, dust-containing air supplied to the dust chamber 4 is sucked in the cleaned air chamber 6 through the cylindrical filter 10, and at this time, dust is collected by the cylindrical filter 10.

As the dust collection operation has been performed, dust is gradually adhered to the outer surface (dust chamber side surface) of the cylindrical filter 10, and differential pressure between the front and the rear of the cylindrical filter 10 has increased. When this differential pressure reaches or exceeds predetermined value, or when operation time exceeds predetermined time regardless of the differential pressure, dust removing work is started.

In this dust removing work, the first and second solenoid valves 28, 36 are opened for predetermined time period, and compressed air is discharged in the form of pulse jet from the first and second discharge nozzles 24, 32 serving as pulse jet discharge sections disposed at outside upper position of the cylindrical filter 10, and at inside position of the cylindrical filters 10 oppositely facing to the outside upper portion.

The compressed air stream thus oppositely discharged collide in the internal spaces of the cylindrical filter 10, and the internal pressure of each cylindrical filter 10 increases, and dust can be uniformly removed over the entire lengths of the cylindrical filter 10.

In this embodiment, any member that obstruct the flow of the air are not disposed in the internal spaces of the cylindrical filter 10, and therefore the pressure of the compressed air is not reduced by such member.

The start of the opening the first and second solenoid valves 28, 36 may be the same time, but a time difference between the start times may be provided, that is, the ejection start time of the compressed air from the first discharge nozzle 24, and the ejection start time of the compressed air from the second discharge nozzle 32 may be staggered.

Furthermore, the time difference between the ejection start times of the compressed air from the two discharge nozzle is changed, so that the collision position of the compressed air from the two discharge nozzles, that is, the position of a local internal pressure rising point can be changed in the longitudinal direction of the cylindrical filter.

Therefore, a time lag between the ejection start times of compressed air from the two discharge nozzles is controlled such that an internal pressure rising point is located near a portion necessary for dust removal of each filter, so that it is possible to implement suitable dust removal in accordance with a dust adhesion state of the filter.

When a method for changing a time difference between the ejection start times of compressed air from the two discharge nozzles for a single or a plurality of shots of the pulse jet stepwise is employed, dust removal can be uniformly performed over the entire inner surfaces of the cylindrical filter 10 while continuously moving the internal pressure rising point.

More specifically, cartridge filter each having a length of 540 mm is used as the cylindrical filter 10, and a time lag between upper and lower pulse start times is sequentially changed in order of 150 ms, 100 ms, 50 ms, 0 ms (no time lag), −50 ms, −100 ms, and −150 ms, so that it is possible to effectively remove dust on the entire filter inner circumferential surface.

As described above, according to the above embodiment, a mass of the compressed air discharged from the first discharge nozzle 24 at the outside position of the cylindrical filter 10, and a mass of the compressed air discharged from the second discharge nozzle 32 disposed at the inside position of the filter oppositely facing, are collided inside the cylindrical filter 10, and dust can be uniformly removed over the entire lengths of the cylindrical filter 10.

The present invention is not limited to the above embodiment of the present invention, and various chances and modifications can be performed within the scope of technical ideas recited in the claims.

In the above embodiment, the inverting path 30a of the pipe line 30 of the second discharge section 20 has the substantially U-shapes while drawing the curved line, that is, while curving. However, as long as the discharge port of the second discharge nozzle 32 provided in the tip is opened toward the first end of the cylindrical filter 10, the inverting path may have any configurations.

Figure 6:
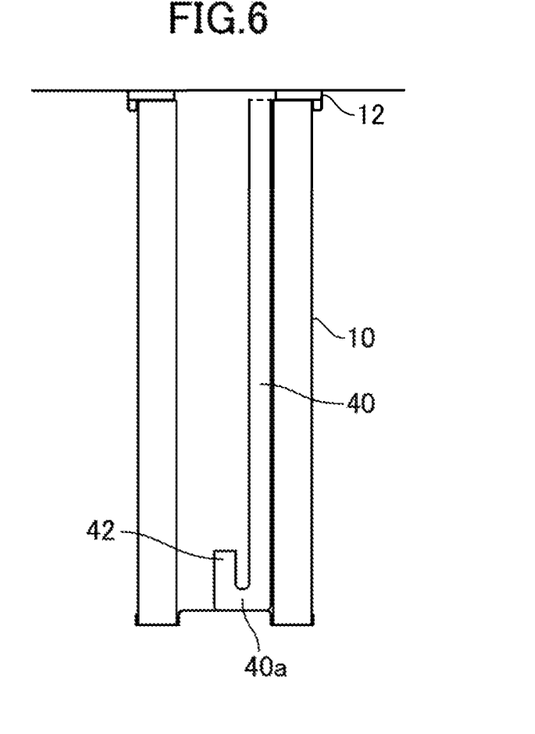
FIG. 6 is a schematic diagram illustrating a modification of the dust removal mechanism.

For example, as illustrated in FIG. 6, each inverting path 40a having a shape obtained by linearly inverting from a path 40 in a "channel-shape" opened upward may be used. A second discharge nozzle 42 is provided in a tip of such an inverting path 40a such that a discharge port is opened oppositely toward the first end of the cylindrical filter 10.

Figure 7:
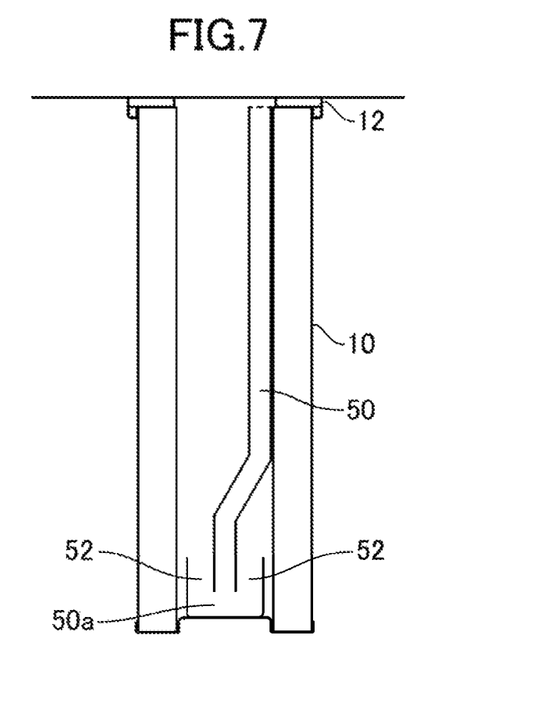
FIG. 7 is a schematic diagram illustrating a modification of the dust removal mechanism.

As illustrated in FIG. 7, each inverting path 50a having an inverted T-shape branched into two right and left portions at a tip of a path 50 may be used. Second discharge nozzle 52 is provided in tips of branched portions of such an inverting path 50a such that discharge port is opened oppositely to toward a first end of a cylindrical filter 10.

Figure 8:
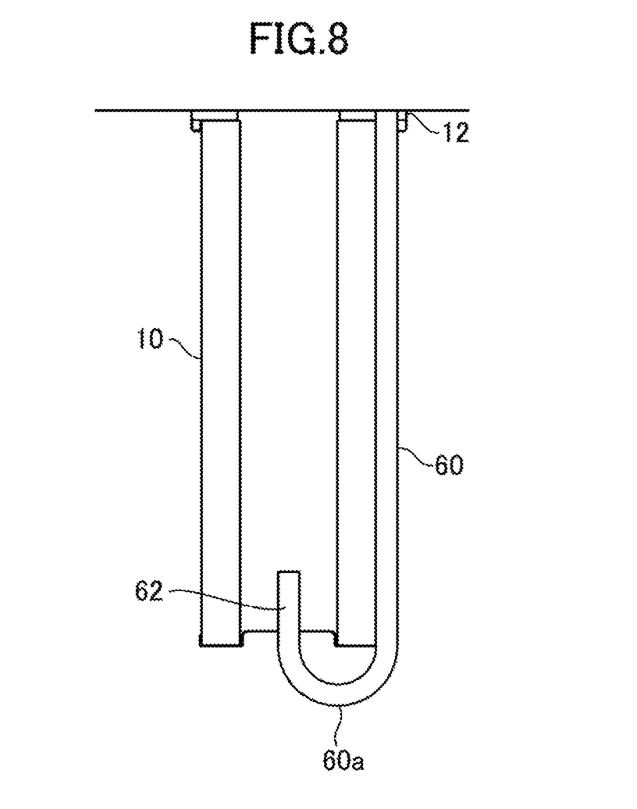
FIG. 8 is a schematic diagram illustrating a modification of the dust removal mechanism.
Figure 9:
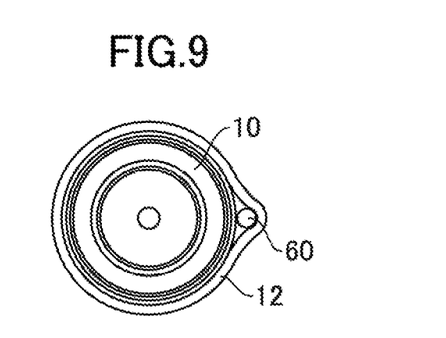
FIG. 9 is a plan view of the modification of FIG. 8.

In the above embodiment, the pipe line is disposed in the internal space of the cylindrical filter 10. However, the present invention is not limited to this arrangement. For example, as illustrated in FIG. 8, each pipe line 60 may be disposed outside a cylindrical filter 10 so as to extend from a first end side to a second end, side of the cylindrical filter 10. An inverting path 60a of the pipe line extends so as to penetrate a bottom wall of the cylindrical filter 10, is disposed such that a tip of the inverting path 60a is located center of an internal space of the cylindrical filter 10, and is provided with a second discharge nozzle 62 in the tip of the inverting path 60a. As illustrated in FIG. 9, an upper end of the pipe line 60 is supported by a filter upper plate 12 disposed in an end of the cylindrical filter 10.

Figure 10:
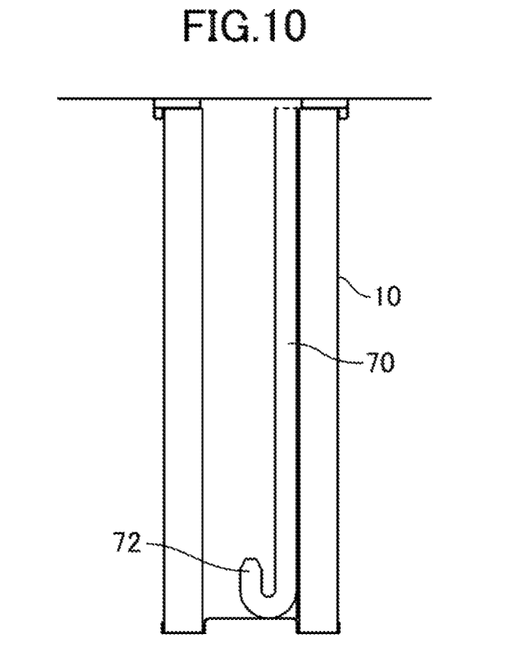
FIG. 10 is a schematic diagram illustrating a modification of the dust removal mechanism.
Figure 11:
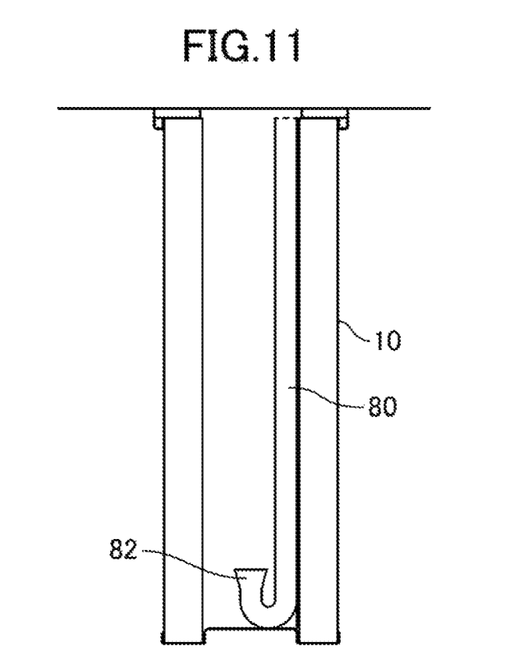
FIG. 11 is a schematic diagram illustrating a modification of the dust removal mechanism.

In the above embodiment, the tip of the second discharge nozzle has the same diameter as the pipe line. However, like configurations of FIG. 10 and FIG. 11, second discharge nozzles 72, 82 at tip of inverting path of path 70, 80 may have tapered shape or expanded shape.

In the embodiments, the pulse jet discharge section is provided on the upper and lower end of each circular cylindrical filter. However, the shape of the filter is not limited to the circular cylindrical shape. For example, a cylindrical fiber having a thin square cross-section and having a closed lower end (a so-called flat plate like filter) may be used.

What is claimed is:

1. A dust collector comprising a dust removal mechanism for removing dust adhered around an outside surface of a cylindrical filter, wherein the cylindrical filter has an opened first end and a second end, and a linear internal air passage connecting the opened first end and the second end, the dust removal mechanism comprising:
a first discharge section having a first discharge nozzle positioned outside of the cylindrical filter and oriented to inject a first stream of pulse jet air inside of the cylindrical filter through the opened first end of the cylindrical filter;
a second discharge section having a second discharge nozzle positioned inside the cylindrical filter and oriented to blow a second stream of pulse jet air from a second end side of the cylindrical filter toward the opened first end of the cylindrical filter so that the first stream of pulse jet air from the first discharge nozzle and the second stream of pulse jet air from the second discharge nozzle collide with each other inside the cylindrical filter to create a mass of compressed air inside the cylindrical filter to blow dust uniformly off the outer surface of the cylindrical filter along an entire length of the cylindrical filter, and
a pipe line provided to supply the second stream of pulse jet air to the second discharge nozzle,
wherein the internal air passage of the cylindrical filter is configured to guide the first and second streams of pulse jet air straight along a length of the cylindrical filter across a cross-section of the internal air passage until they collide with each other.

2. The dust collector according to claim 1, wherein the pipe line has a turnaround section, and the second discharge nozzle is provided at an end of the turnaround section.

3. The dust collector according to claim 2, wherein the turnaround section has a substantially U-shape.

4. The dust collector according to claim 1, wherein the pipe line is disposed inside of the cylindrical filter.

5. The dust collector according to claim 2, wherein the pipe line is disposed outside the cylindrical filter and the turnaround section is extensive into inside of the cylindrical filter and attached to the second discharge nozzle.

6. The dust collector according to claim 1, wherein the second discharge nozzle has a tapered-off shape.

7. The dust collector according to claim 1, wherein the second discharge nozzle has an expanded shape.

8. The dust collector according to claim 2, wherein the turnaround section is branched into a plurality of portions, and the second discharge nozzle is provided for each of the plurality of portions.

9. The dust collector according to claim 1, wherein the second discharge section is formed integrally with the cylindrical filter, and detachable, along with the cylindrical filter, from the dust collector.

10. The dust collector according to claim 1, comprising:
a cell plate configured to separate a dust chamber from a cleaned air chamber; and
a filter frame configured to mount the cylindrical filter on the cell plate, wherein the filter frame has a projection formed in alignment with a hole formed in the opened first end of the cylindrical filter, and the cylindrical filter is detachably mounted on the dust collector with the projection engaged in the hole.

11. A dust removal method implemented with the dust collector according to claim 1, the dust removal method comprising:
discharging the first stream of pulse jet air from the first discharge section and the second stream of pulse jet air from the second discharge section at time intervals running out of synchronous between the first and second streams of pulse jet air to remove dust off the outside surface of the cylindrical filter.

12. The dust removal method according to claim 11, wherein discharging the first and second streams of pulse jet air at time intervals running out of synchronous between the first and second streams of pulse jet air comprises changing the time intervals over time.

* * * * *